US012665184B2

(12) United States Patent
Kim et al.

(10) Patent No.: US 12,665,184 B2
(45) Date of Patent: Jun. 23, 2026

(54) BATTERY CELL WITH IMPROVED SAFETY AND METHOD OF MANUFACTURING THE SAME

(71) Applicant: LG Energy Solution, Ltd., Seoul (KR)

(72) Inventors: Seung Cheol Kim, Daejeon (KR); Seok Je Kim, Daejeon (KR); Ki Woong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 891 days.

(21) Appl. No.: 17/792,037

(22) PCT Filed: Aug. 19, 2021

(86) PCT No.: PCT/KR2021/010989
§ 371 (c)(1),
(2) Date: Jul. 11, 2022

(87) PCT Pub. No.: WO2022/039508
PCT Pub. Date: Feb. 24, 2022

(65) Prior Publication Data
US 2023/0048711 A1 Feb. 16, 2023

(30) Foreign Application Priority Data
Aug. 21, 2020 (KR) ........................ 10-2020-0105020

(51) Int. Cl.
H01M 4/139 (2010.01)
H01M 4/04 (2006.01)
H01M 4/36 (2006.01)
H01M 10/052 (2010.01)
H01M 10/0585 (2010.01)
H01M 10/42 (2006.01)
H01M 50/46 (2021.01)

(52) U.S. Cl.
CPC ......... H01M 4/139 (2013.01); H01M 4/0433 (2013.01); H01M 4/366 (2013.01);
(Continued)

(58) Field of Classification Search
CPC .. H01M 50/14; H01M 50/107; H01M 50/538; H01M 50/152; H01M 50/533
See application file for complete search history.

(56) References Cited

U.S. PATENT DOCUMENTS

| | | |
|---|---|---|
| 2006/0006063 A1 | 1/2006 | Tanaka et al. |
| 2015/0017523 A1 | 1/2015 | Hirai et al. |

(Continued)

FOREIGN PATENT DOCUMENTS

| | | |
|---|---|---|
| CN | 105474454 B | 7/2018 |
| CN | 108352576 A | 7/2018 |

(Continued)

OTHER PUBLICATIONS

International Search Report for Application No. PCT/KR2021/010989 mailed Nov. 22, 2021, 2 pages.

(Continued)

*Primary Examiner* — Allison Bourke
*Assistant Examiner* — Verita E Grannum
(74) *Attorney, Agent, or Firm* — Lerner David LLP

(57) ABSTRACT

The present invention relates to a battery cell with improved safety and a method of manufacturing the same, and more particularly a battery cell configured such that an electrode assembly including a positive electrode (200) and a negative electrode (300) located so as to be opposite each other in the state in which a separator (400) is interposed therebetween is received in a cell case (100), wherein the positive electrode (200) includes a positive electrode plate (210) and a positive electrode active material layer (220) provided on one surface and/or the other surface of the positive electrode plate (210), the negative electrode (300) includes a negative electrode plate (310) and a negative electrode active material layer (320) provided on one surface and/or the other surface of the negative electrode plate (310), the positive electrode (Continued)

active material layer (220) includes a first flat portion (221) and a first inclined portion (222) provided at each of opposite sides of the first flat portion (221), and the negative electrode active material layer (320) includes a second flat portion (321) and a second inclined portion (322) provided at each of opposite sides of the second flat portion (321) and a method of manufacturing the same.

8 Claims, 5 Drawing Sheets

(52) U.S. Cl.
CPC ..... *H01M 10/052* (2013.01); *H01M 10/0585* (2013.01); *H01M 10/4235* (2013.01); *H01M 50/46* (2021.01)

(56)                 References Cited

U.S. PATENT DOCUMENTS

| | | | | |
|---|---|---|---|---|
| 2016/0181650 | A1* | 6/2016 | Ide ................... | H01M 10/0525 |
| | | | | 429/211 |
| 2018/0272456 | A1* | 9/2018 | Kobayashi ........... | H01M 4/661 |

| | | | |
|---|---|---|---|
| 2018/0277816 | A1 | 9/2018 | Minagata et al. |
| 2018/0366786 | A1 | 12/2018 | Fujii |
| 2020/0058962 | A1 | 2/2020 | Kim et al. |

FOREIGN PATENT DOCUMENTS

| | | | |
|---|---|---|---|
| CN | 109088091 | A | 12/2018 |
| JP | 2001015146 | A | 1/2001 |
| JP | 2004303622 | A | 10/2004 |
| JP | 2006024710 | A | 1/2006 |
| JP | 2011198483 | A | 10/2011 |
| JP | 2015146237 | A | 8/2015 |
| JP | 2017076631 | A | 4/2017 |
| JP | 2018160345 | A | 10/2018 |
| KR | 20170111721 | A | 10/2017 |
| KR | 20180134757 | A | 12/2018 |
| KR | 102124105 | B1 | 6/2020 |

OTHER PUBLICATIONS

Extended European Search Report including Written Opinion for Application No. 21858595.8 dated Jul. 4, 2023, pp. 1-8.
Search Report dated Feb. 25, 2025 from the Office Action for Chinese Application No. 202180010307.8 Issued Feb. 27, 2025, pp. 1-2.

* cited by examiner

【FIG. 1】
-- Prior Art --
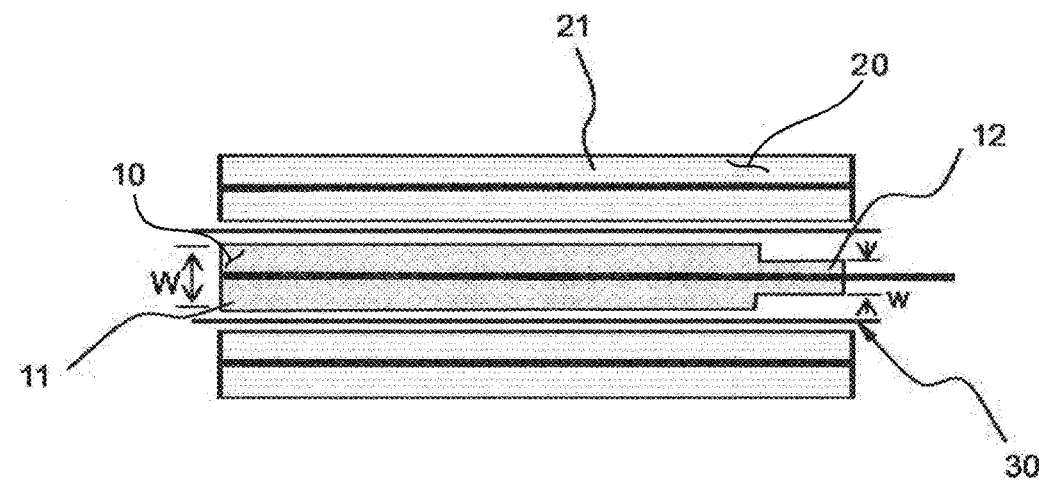
【FIG. 2】
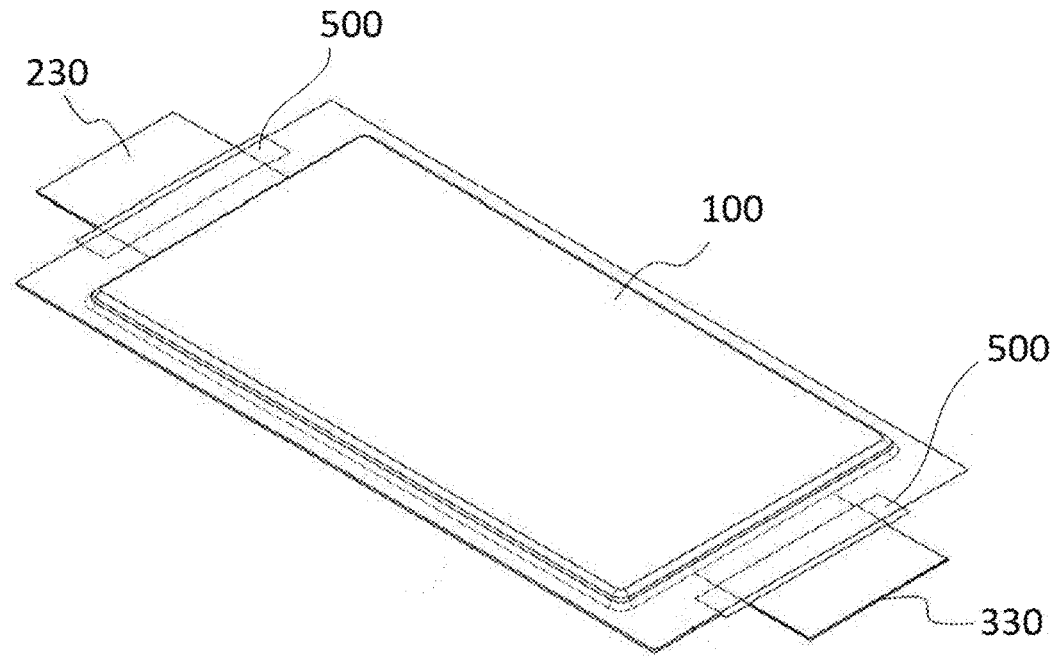

【FIG. 3】
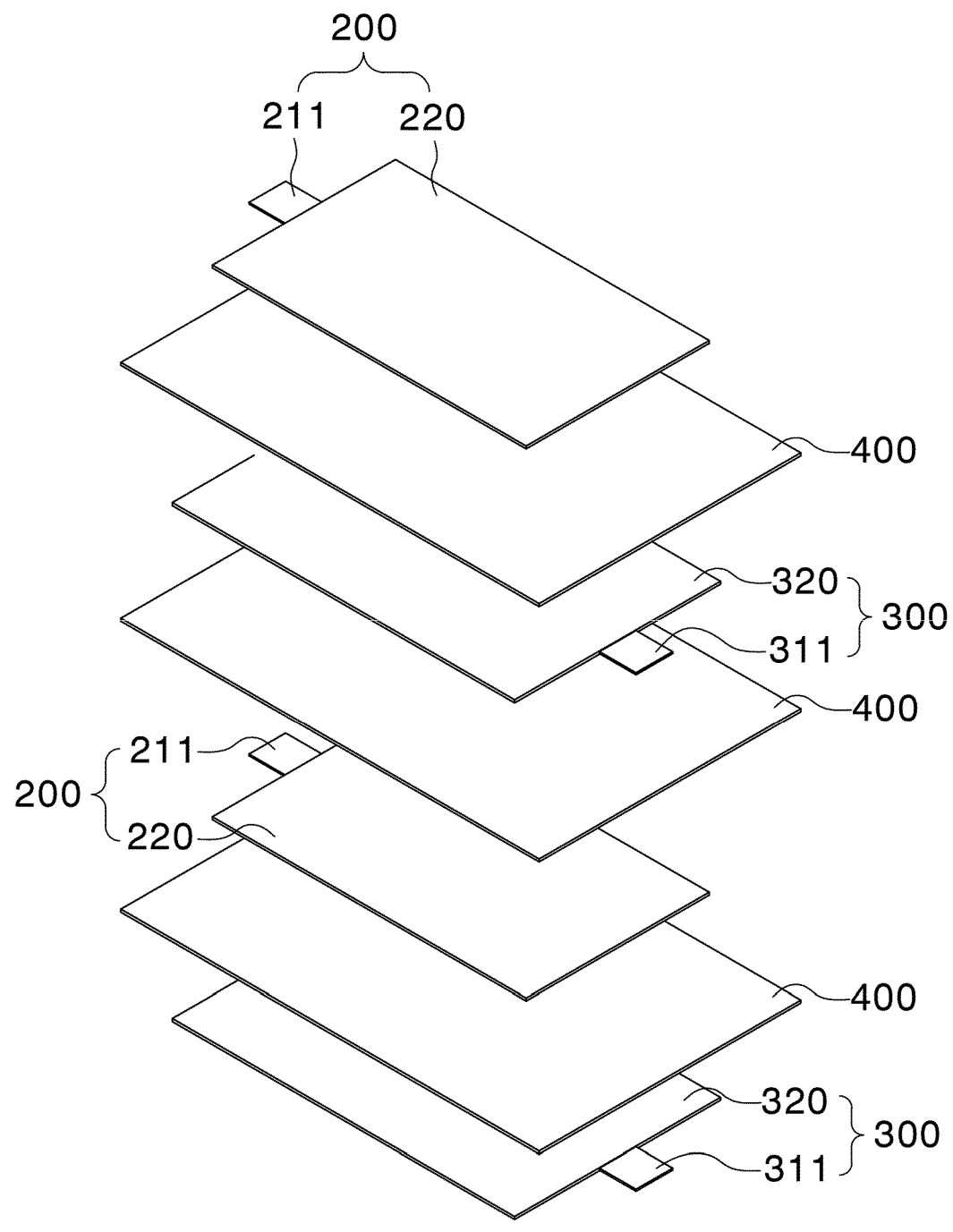

【FIG. 4】
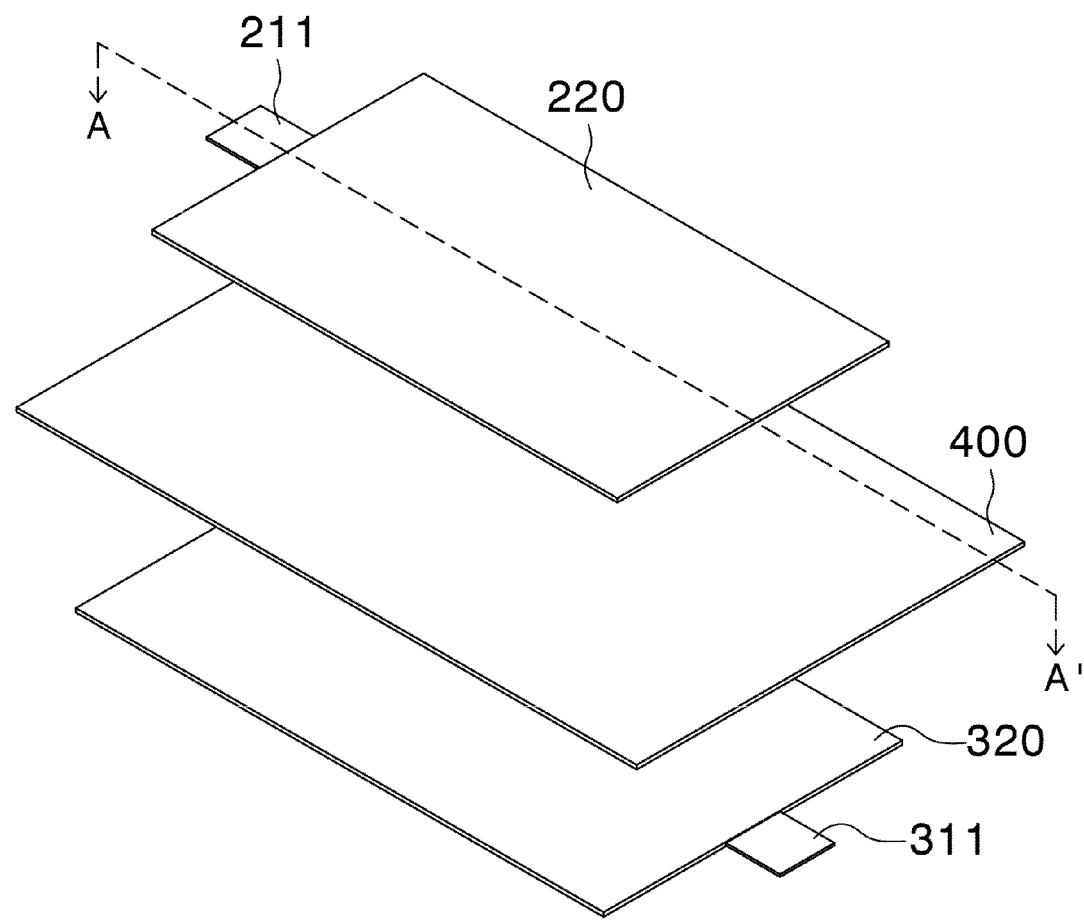

【FIG. 5】
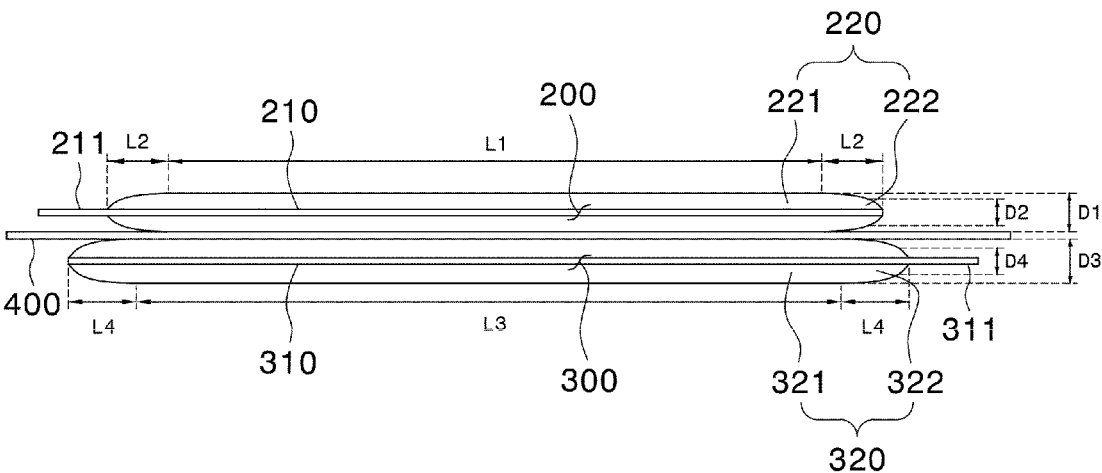
【FIG. 6】
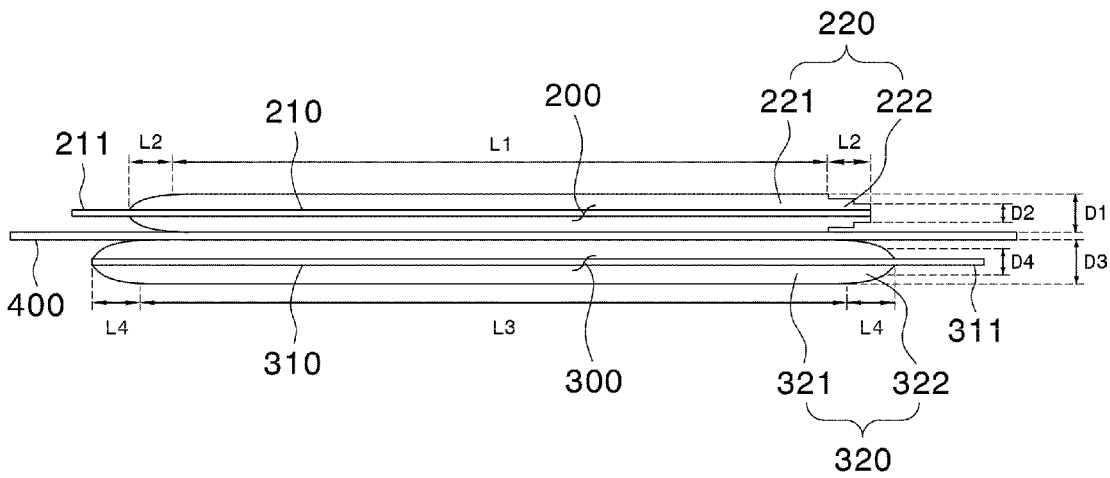

【FIG. 7】
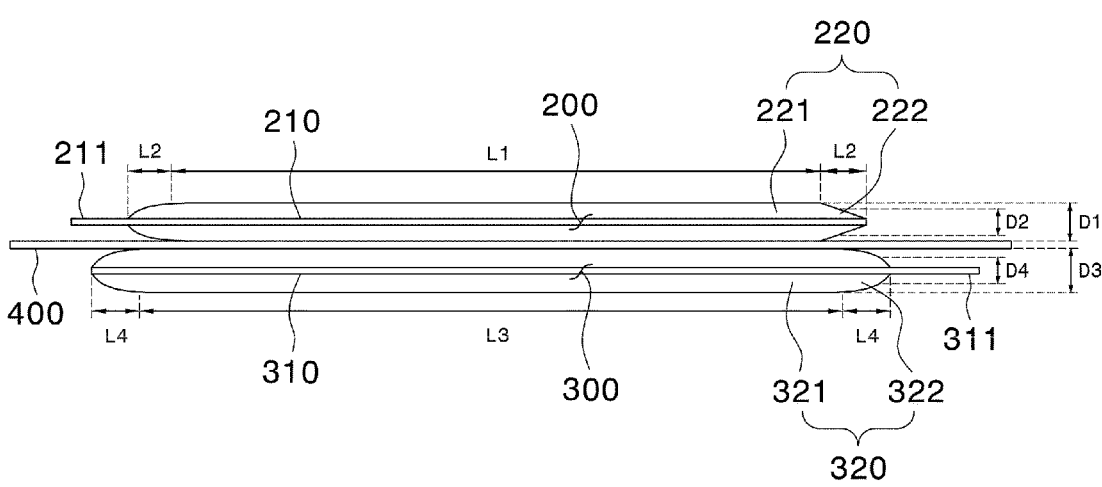

BATTERY CELL WITH IMPROVED SAFETY AND METHOD OF MANUFACTURING THE SAME

CROSS-REFERENCE TO RELATED APPLICATIONS

This application is a national stage entry under 35 U.S.C. § 371 of International Application No. PCT/KR2021/010989, filed on Aug. 19, 2021, published in Korean, which claims priority to Korean Patent Application No. 10-2020-0105020, filed on Aug. 21, 2020, the disclosures of which are hereby incorporated herein by reference in their entireties.

TECHNICAL FIELD

The present invention relates to a battery cell with improved safety and a method of manufacturing the same, and more particularly to a battery cell with improved safety configured such that an inclined portion is formed at an end of a positive electrode, whereby precipitation of lithium ions is prevented, and therefore occurrence of an event is inhibited and energy density of the battery cell is improved, and a method of manufacturing the same.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

FIG. 1 is a sectional view of a conventional electrode assembly. Referring to FIG. 1, the electrode assembly, which constitutes a pouch-shaped battery cell, is configured to have a structure in which a separator 30 is interposed between a positive electrode 10 and a negative electrode 20 and in which each of mixtures 11 and 21 including electrode active materials is applied to one surface or opposite surfaces of a corresponding one of current collectors.

During a repetitive charging and discharging process, however, a space in the negative electrode 20, into which lithium ions separated from the positive electrode 10 are to be inserted, becomes insufficient, whereby the lithium ions may be precipitated at the surface of the negative electrode as lithium metal, or metallic impurities mixed during a battery manufacturing process may be recrystallized and may come into contact with the positive electrode through the separator, whereby internal short circuit may occur.

In order to maximally inhibit such a phenomenon, a structure in which the section capacity of the negative electrode is larger than the section capacity of the positive electrode at positions of the positive electrode and the negative electrode at which the positive electrode and the negative electrode face each other in the state in which the separator is interposed therebetween has been adopted. However, research on adjustment of the section capacities achieved through application or coating at the edges of the electrodes in connection with improvement in energy density has not been sufficiently conducted.

DISCLOSURE

Technical Problem

The present invention has been made in view of the above problems, and it is an object of the present invention to provide a battery cell with improved safety configured such that precipitation of lithium ions is inhibited while energy density of the battery cell is maximally improved and a method of manufacturing the same.

Technical Solution

In order to accomplish the above object, a battery cell according to the present invention is configured such that an electrode assembly including a positive electrode (200) and a negative electrode (300) located so as to be opposite each other in the state in which a separator (400) is interposed therebetween is received in a cell case (100), wherein the positive electrode (200) includes a positive electrode plate (210) and a positive electrode active material layer (220) provided on one surface and/or the other surface of the positive electrode plate (210); the negative electrode (300) includes a negative electrode plate (310) and a negative electrode active material layer (320) provided on one surface and/or the other surface of the negative electrode plate (310); the positive electrode active material layer (220) includes a first flat portion (221) and a first inclined portion (222) provided at each of opposite sides of the first flat portion (221); and the negative electrode active material layer (320) includes a second flat portion (321) and a second inclined portion (322) provided at each of opposite sides of the second flat portion (321).

Also, in the battery cell according to the present invention, the positive electrode active material layer (220) may be located so as to overlap the negative electrode active material layer (320), and the sum of the length (L3) of the second flat portion and the length (L4) of the second inclined portion of the negative electrode active material layer (320) may be greater than the sum of the length (L1) of the first flat portion and the length (L2) of the first inclined portion of the positive electrode active material layer (220).

Also, in the battery cell according to the present invention, the negative electrode section capacity of the negative electrode active material layer (320) in a thickness (D3) direction of the second flat portion may be greater than the positive electrode section capacity of the positive electrode active material layer (220) located on the same vertical extension line.

Also, in the battery cell according to the present invention, the negative electrode section capacity of the negative electrode active material layer (320) in a thickness (D4) direction of the second inclined portion may be greater than the positive electrode section capacity of the positive electrode active material layer (220) located on the same vertical extension line.

Also, in the battery cell according to the present invention, the vertical section of the first inclined portion (222) of the positive electrode active material layer (220) may have a thickness gradually decreasing toward the edge thereof.

Also, in the battery cell according to the present invention, the first inclined portion (222) of the positive electrode active material layer (220) may be configured to have a conical shape.

Also, in the battery cell according to the present invention, the first inclined portion (222) of the positive electrode active material layer (220) may be configured to have a stepped shape.

Also, in the battery cell according to the present invention, an inclined surface may be formed at the first inclined portion (222) of the positive electrode active material layer (220) such that the first inclined portion forms an acute angle together with the first flat portion (221).

In addition, a battery cell manufacturing method according to the present invention includes preparing a cell case (100) and an electrode assembly including a positive electrode (200) and a negative electrode (300) located so as to be opposite each other in the state in which a separator (400) is interposed therebetween; and sealing the edge of the cell case (100) after receiving the electrode assembly in the cell case (100), wherein the positive electrode (200) includes a positive electrode plate (210) and a positive electrode active material layer (220) provided on one surface and/or the other surface of the positive electrode plate (210), the negative electrode (300) includes a negative electrode plate (310) and a negative electrode active material layer (320) provided on one surface and/or the other surface of the negative electrode plate (310), the positive electrode active material layer (220) includes a first flat portion (221) and a first inclined portion (222) provided at each of opposite sides of the first flat portion (221), and the negative electrode active material layer (320) includes a second flat portion (321) and a second inclined portion (322) provided at each of opposite sides of the second flat portion (321).

Also, in the battery cell manufacturing method according to the present invention, the vertical section of the first inclined portion (222) of the positive electrode active material layer (220) may have a thickness gradually decreasing toward the edge thereof.

Also, in the battery cell manufacturing method according to the present invention, the first inclined portion (222) of the positive electrode active material layer (220) may be cut so as to have a stepped shape.

Also, in the battery cell manufacturing method according to the present invention, a positive electrode active material may be applied a plurality of times such that the first inclined portion (222) of the positive electrode active material layer (220) has a stepped shape.

Also, in the battery cell manufacturing method according to the present invention, a positive electrode active material may be injected into a mold such that the first inclined portion (222) of the positive electrode active material layer (220) has a stepped shape.

Also, in the battery cell manufacturing method according to the present invention, the first inclined portion (222) of the positive electrode active material layer (220) may be cut using a laser such that an inclined surface is formed at the first inclined portion, whereby the first inclined portion forms an acute angle together with the first flat portion (221).

In addition, the present invention provides a battery module including a battery cell having at least one of the above-mentioned features.

Advantageous Effects

As is apparent from the above description, a battery cell with improved safety according to the present invention and a method of manufacturing the same have an advantage in that an inclined portion is formed at one end or opposite ends of a positive electrode such that the section capacity of the positive electrode is less than the section capacity of a negative electrode that faces the positive electrode, whereby it is possible to prevent precipitation of lithium ions separated from the positive electrode, and therefore it is possible to prevent secondary damage, such as performance degradation, heat generation, and fire outbreak.

DESCRIPTION OF DRAWINGS

FIG. 1 is a sectional view of a conventional electrode assembly.

FIG. 2 is an external perspective view of a battery cell according to a preferred embodiment of the present invention.

FIG. 3 is an exploded perspective view of an electrode assembly according to a first preferred embodiment of the present invention.

FIG. 4 is an enlarged exploded perspective view showing a positive electrode, a separator, and a negative electrode in the electrode assembly of FIG. 3.

FIG. 5 is a sectional view of the electrode assembly taken along line A-A' of FIG. 4.

FIG. 6 is a sectional view of an electrode assembly according to a second preferred embodiment of the present invention.

FIG. 7 is a sectional view of an electrode assembly according to a third preferred embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery cell with improved safety according to the present invention and a method of manufacturing the same will be described with reference to the accompanying drawings.

FIG. 2 is an external perspective view of a battery cell according to a preferred embodiment of the present invention, FIG. 3 is an exploded perspective view of an electrode assembly according to a first preferred embodiment of the present invention, and FIG. 4 is an enlarged exploded perspective view showing a positive electrode, a separator, and a negative electrode in the electrode assembly of FIG. 3.

Referring to FIGS. 2 to 4, the battery cell according to the present invention includes a cell case 100, a positive electrode 200, a negative electrode 300, a separator 400, and an insulation member 500.

First, the cell case 100 receives an electrode assembly, and is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact strength resistance, and excellent chemical resistance, is the most preferably used.

Here, the electrode assembly may be a jelly-roll type assembly, which is configured to have a structure in which a long sheet type positive electrode 200 and a long sheet type negative electrode 300 are wound in the state in which a separator 400 is interposed therebetween, a stacked type electrode assembly, which is configured to have a structure in which a rectangular positive electrode 200 and a rectangular negative electrode 300 are stacked in the state in which a separator 400 is interposed therebetween, a stacked and folded type assembly, which is configured to have a structure in which unit cells are wound using a long separation film, or a laminated and stacked type assembly, which is configured to have a structure in which battery cells are stacked in the state in which a separator 400 is interposed therebetween and are then attached to each other. However, the present invention is not limited thereto.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air permeation such that the outer layer exhibits high heat resistance and chemical resistance while protecting the electrode assembly. As an example, the outer layer may be made of nylon or polyethylene terephthalate. However, the present invention is not limited thereto.

The insulation member 500 is located at each of the upper and lower surfaces of a positive electrode lead 230 and a negative electrode lead 330 to improve sealability with the cell case 100 and to guarantee insulation between the positive electrode lead 230 and the cell case 100 and between the negative electrode lead 330 and the cell case 100.

Meanwhile, the electrode assembly according to the preferred embodiment of the present invention is configured to have a structure in which the separator 400 is interposed between the positive electrode 200 and the negative electrode 300. Although two positive electrodes 200, two negative electrodes 300, and three separators 400 are shown in FIG. 3, which is merely an illustration, the number thereof may be changed without limit in consideration of required capacity.

FIG. 5 is a sectional view of the electrode assembly taken along line A-A' of FIG. 4. Referring to FIG. 5 together with FIG. 4, the positive electrode 200 includes a positive electrode plate 210, a positive electrode active material layer 220, and a positive electrode lead 230.

The positive electrode plate 210 is flat, and may be made of aluminum. A positive electrode tab 211 extends a predetermined length from one edge of the positive electrode plate so as to be electrically connected to the positive electrode lead 230.

The positive electrode active material layer 220 is provided on each of opposite surfaces of the positive electrode plate 210 so as to have a predetermined thickness. A lithium-containing transition metal oxide, such as lithium cobalt dioxide, lithium nickel dioxide, or lithium manganese dioxide, or a lithium chalcogenide compound may be used as a positive electrode active material. However, the positive electrode active material is not particularly restricted as long as the positive electrode active material is known.

The positive electrode active material layer 220, which is located on the upper surface, the lower surface, or the upper and lower surfaces of the positive electrode plate 210, may include a first flat portion 221 and a first inclined portion 222. Specifically, the first flat portion 221 is located at the middle of the positive electrode plate 210, and the first inclined portion 222 is located at each of opposite sides of the first flat portion 221. The first inclined portion may be configured to have a conical shape, the thickness of which gradually decreases toward the edge of the positive electrode plate 210.

The negative electrode 300 includes a negative electrode plate 310, a negative electrode active material layer 320, and a negative electrode lead 330.

The negative electrode plate 310 is flat in the same manner as the positive electrode plate 210, and may be made of copper. A negative electrode tab 311 extends a predetermined length from one edge of the negative electrode plate so as to be electrically connected to the negative electrode lead 330.

The negative electrode active material layer 320 is provided on each of opposite surfaces of the negative electrode plate 310 so as to have a predetermined thickness. A carbon material, such as crystalline carbon, amorphous carbon, carbon composite, or carbon fiber, lithium metal, or a lithium alloy may be used as a negative electrode active material. However, the negative electrode active material is not particularly restricted as long as the negative electrode active material is known.

The negative electrode active material layer 320, which is located on each of the upper and lower surfaces of the negative electrode plate 310, may include a second flat portion 321 and a second inclined portion 322. Specifically, the second flat portion 321 is located at the middle of the negative electrode plate 310, and the second inclined portion 322 is located at each of opposite sides of the second flat portion 321. The second inclined portion may be configured to have a conical shape, the thickness of which gradually decreases toward the edge of the negative electrode plate 310.

The separator 400, which is manufactured by coating one of polyethylene, polystyrene, polypropylene, and polyethylene-co-polypropylene with polyvinylidene fluoride-cohexafluoropropylene, is located between the positive electrode 200 and the negative electrode 300.

Although the battery cell is shown as being a bidirectional battery cell configured such that the positive electrode tab 211 and the negative electrode tab 311 are located in opposite directions in the drawings, the battery cell may be a unidirectional battery cell configured such that the tabs are located in the same direction.

Meanwhile, in the first preferred embodiment of the present invention, it is preferable for the positive electrode active material layer 220 to be located so as to overlap the negative electrode active material layer 320, and it is also preferable for the length of the positive electrode active material layer 220 to be less than the length of the negative electrode active material layer 320.

More specifically, it is preferable for the sum of the length L1 of the first flat portion and the length L2 of the first inclined portion of the positive electrode active material layer 220 to be less than the sum of the length L3 of the second flat portion and the length L4 of the second inclined portion of the negative electrode active material layer 320, and it is more preferable for the negative electrode section capacity of the negative electrode active material layer 320 in a thickness (D3) direction of the second flat portion and a thickness (D4) direction of the second inclined portion to be equal to or greater than the positive electrode section capacity of the positive electrode active material layer 220 located on the same vertical extension line in a thickness (D1) direction of the first flat portion and a thickness (D2) direction of the first inclined portion.

If the above conditions are satisfied, a portion of the first inclined portion 222 may be disposed so as to overlap the second flat portion 321.

This disposition is made in order to prevent precipitation of lithium ions and to maximize energy density, as previously described. That is, when the positive electrode section capacity of the positive electrode 200 in the thickness (D2) direction of the first inclined portion is greater than the negative electrode section capacity of the negative electrode active material layer 320 located on the same vertical extension line, lithium ions of the positive electrode active material layer 220 do not pass through the separator 400, whereby the lithium ions are precipitated, which causes an event of the battery cell, such as performance degradation or fire outbreak. However, the battery cell according to the present invention is capable of fundamentally preventing such problems.

Furthermore, a gap between the positive electrode 200 and the negative electrode 300, i.e. an uncoated portion at the edge of the positive electrode active material layer 220 corresponding to the edge of the negative electrode active material layer 220, may be reduced due to the first inclined portion 222 of the positive electrode active material layer 220, whereby energy density may be increased.

Meanwhile, although a method of forming the first flat portion 221 and the first inclined portion 222 of the positive electrode active material layer 220 and the second flat portion 321 and the second inclined portion 322 of the negative electrode active material layer 320 is not particularly restricted, an active material in a slurry state may be applied to form the flat and inclined portions, as an example. At this time, the second inclined portion 322 is naturally formed due to fluidity of the active material.

FIG. 6 is a sectional view of an electrode assembly according to a second preferred embodiment of the present invention. Referring to FIG. 6, the electrode assembly according to the second preferred embodiment of the present invention is identical to the electrode assembly according to the first embodiment described above except for the first inclined portion 222 of the positive electrode active material layer 220.

The first inclined portion 222 according to the second embodiment of the present invention may be configured to have a stepped shape. Specifically, the first inclined portion may be configured to have a stepped shape having a thickness that gradually decreases toward the edge of the positive electrode plate.

FIG. 7 is a sectional view of an electrode assembly according to a third preferred embodiment of the present invention. Referring to FIG. 7, the electrode assembly according to the third preferred embodiment of the present invention is identical to the electrode assembly according to the first embodiment described above except for the first inclined portion 222 of the positive electrode active material layer 220.

The first inclined portion 222 according to the third embodiment of the present invention may be cut so as to form a predetermined acute angle together with the first flat portion 221, whereby the first inclined portion may be provided with an inclined surface.

Hereinafter, a battery cell manufacturing method according to the present invention will be described.

The battery cell manufacturing method according to the present invention includes a step of preparing an electrode assembly including a positive electrode 200 and a negative electrode 300 located so as to be opposite each other in the state in which a separator 400 is interposed therebetween and a cell case 100 and a step of receiving the electrode assembly in the cell case 100 and sealing the edge of the cell case 100.

Meanwhile, a positive electrode active material layer 220 is located on one surface or opposite surfaces of a positive electrode plate 210 of the positive electrode 200. At this time, when a first inclined portion 222 is formed so as to have a conical shape, a positive electrode active material in a slurry state is applied to the positive electrode plate 210 once. When the first inclined portion is formed so as to have a stepped shape, on the other hand, the positive electrode active material is applied a plurality of times so as to have a stepped shape. Alternatively, a stepped mold may be located on the positive electrode plate 210, and the positive electrode active material may be applied or injected to form a stepped first inclined portion.

When an inclined surface needs to be formed on the first inclined portion 222 such that the first inclined portion forms an acute angle together with the first flat portion 221, a corresponding portion is cut using a laser.

Meanwhile, a negative electrode active material layer 320 is located on one surface or opposite surfaces of a negative electrode plate 310 of the negative electrode 300. A negative electrode active material in a slurry state may be applied to the negative electrode plate 310 to form the negative electrode active material layer.

The present invention may provide a battery module or a battery pack including a battery cell having at least one of the above-mentioned features. The battery module or a battery pack may be mounted in a device, such as an electric vehicle, a hybrid electric vehicle, or a plug-in hybrid electric vehicle.

Those skilled in the art to which the present invention pertains will appreciate that various applications and modifications are possible within the category of the present invention based on the above description.

DESCRIPTION OF REFERENCE SYMBOLS

100: Cell case
200: Positive electrode
210: Positive electrode plate
211: Positive electrode tab
220: Positive electrode active material layer
221: First flat portion 222: First inclined portion
230: Positive electrode lead
300: Negative electrode
310: Negative electrode plate
311: Negative electrode tab
320: Negative electrode active material layer
321: Second flat portion 322: Second inclined portion
330: Negative electrode lead
400: Separator
500: Insulation member
L1: Length of first flat portion L2: Length of first inclined portion
L3: Length of second flat portion L4: Length of second inclined portion
D1: Thickness of first flat portion D2: Thickness of first inclined portion
D3: Thickness of second flat portion D4: Thickness of second inclined portion

The invention claimed is:

1. A battery cell comprising an electrode assembly having a positive electrode and a negative electrode opposite each other with a separator interposed therebetween received in a cell case, wherein the positive electrode comprises a positive electrode plate and a positive electrode active material layer provided on a first surface and a second surface of the positive electrode plate, the negative electrode comprises a negative electrode plate and a negative electrode active material layer provided on a first surface or and a second surface of the negative electrode plate, each positive electrode active material layer having a first flat portion and a first inclined portion at opposite sides of the first flat portion, and each negative electrode active material layer having a second flat portion and a second inclined portion at opposite sides of the second flat portion, wherein a negative electrode section capacity of the negative electrode active material layer of the second flat portion in a thickness direction is greater than a positive electrode section capacity of the positive electrode active material layer, the negative electrode section capacity and the positive electrode section capacity being determined along a first single common vertical extension line extending in the thickness direction, and wherein a negative electrode section capacity of the negative electrode active material layer of the second inclined portion is greater than the positive electrode section capacity of the positive electrode active material layer, the negative electrode section capacity and the positive electrode section capacity being determined along a second single common vertical extension line extending in the thickness direction.

2. The battery cell according to claim 1, wherein
   the positive electrode active material layer overlaps the negative electrode active material layer, and
   a sum of a length of the second flat portion and a length of the second inclined portion of each negative electrode active material layer is greater than a sum of a length of the first flat portion and a length of the first inclined portion of each positive electrode active material layer.

3. The battery cell according to claim 1, wherein a vertical section of the first inclined portion of each positive electrode active material layer has a thickness decreasing toward an edge thereof.

4. The battery cell according to claim 3, wherein the first inclined portion of each positive electrode active material layer has a conical shape.

5. The battery cell according to claim 3, wherein the first inclined portion of each positive electrode active material layer has a stepped shape.

6. The battery cell according to claim 3, wherein an inclined surface is formed at the first inclined portion of each positive electrode active material layer such that the first inclined portion forms an acute angle relative to the first flat portion.

7. A battery module comprising the battery cell according to claim 1.

8. The battery cell according to claim 1, wherein the first inclined portion of each positive electrode active material layer extends to a same horizontal location along the positive electrode plate, and the second inclined portion of each negative electrode active material layer extends to a same horizontal location along the negative electrode plate.

* * * * *